United States Patent [19]
Beeghly et al.

[11] Patent Number: 5,537,954
[45] Date of Patent: Jul. 23, 1996

[54] HEATED PET SWEATER

[76] Inventors: Ronald E. Beeghly; Debra L. Beeghly, both of Rt. 1 Box 132-1, Swanton, Md. 21561

[21] Appl. No.: 236,649

[22] Filed: May 2, 1994

[51] Int. Cl.⁶ .................................................. A01K 29/00
[52] U.S. Cl. ............................................................ 119/850
[58] Field of Search ..................... 119/850, 156, 119/158–160; 128/873, 874, 875; 54/79.1, 80; 2/94, 171.2, 7, 247, 248, 249, 250

[56]            References Cited
         U.S. PATENT DOCUMENTS

| 2,940,443 | 6/1960 | Baker | 128/874 |
| 4,114,353 | 9/1978 | Horton et al. | 54/79.1 |
| 5,056,160 | 10/1991 | Buchanan | 2/88 |
| 5,084,986 | 2/1992 | Usui | 36/2.6 |
| 5,293,840 | 3/1994 | Wedlick | 119/850 |

*Primary Examiner*—Thomas Price

[57]            ABSTRACT

An heated pet sweater including a sweaterlike garment worn by a pet wherein the garment has one or more pockets disposed thereon. The pockets are generally of construction permitting substantially free passage of thermal energy to the body of the animal wearer and being thermally isolated otherwise and furthermore the pockets have thermal energy generation devices employing chemical reaction, direct energy storage, or latent heat of fusion energy storage for providing heat to the animal at substantially constant temperatures for extended periods. An alternate embodiment provides for cooling of an animal using latent heat energy extraction means disposed in pockets of an animal worn garment.

1 Claim, 4 Drawing Sheets

HEATED PET SWEATER

BACKGROUND OF THE INVENTION

1. Field of the Invention

The present invention relates to pet garments and more particularly pertains to a heated pet sweater which may be employed to provide warmth to a dog or cat wearer thereof.

2. Description of the Prior Art

The use of pet garments is known in the prior art. More specifically, pet garments including sweaters heretofore devised and utilized for providing warmth to a pet are known to consist basically of familiar, expected and obvious structural configurations, notwithstanding the myriad of designs encompassed by the crowded prior art which have been developed for the fulfillment of countless objectives and requirements.

The present invention is directed to improving devices for a heated pet sweater in a manner which is safe, secure, economical and aesthetically pleasing.

For example, U.S. Pat. No. 3,443,066 to Weibel discloses a heated outdoor garment comprising an inner and outer panel having a series of electrical heating wires disposed between the panels and having a battery providing electrical power therein and furthermore the garment is designed to surround and provide heat to one or more human forms. There is no provision in the Weibel invention for application to a pet such as a dog or cat for the purpose of providing non-electrical heat thereto. The present invention comprises a garment for wear by animals such as dogs or cats wherein one or more pockets are included therein for holding pouches of exothermically reacting substances or previously warmed thermal energy storage materials.

In U.S. Pat. No. 5,060,458 to Curtis, a protective dog coat is disclosed comprising an adjustably fitting coat having a highly visible outer layer and an thermally insulating inner liner thereby providing visibility of the dog at night or during hunting expeditions and maintaining the dog's body heat by thermal insulating means. There is no provision for inclusion of an exothermic reactor or energy storage pouches in the Curtis invention. The present invention is designed to provide warmth to an animal by a combination of insulating means and heat generation by an exothermic chemical reaction or a passive thermal energy storage device.

In U.S. Pat. No. 5,003,756 to Mazzotta, Sr. a dog garment with flea repelling means is described. The Mazzotta Sr. invention comprises a dog coat having an inner liner having replaceable flea repellant strips affixed therein. The Mazzotta, Sr. invention has no provision for providing external heat to a dog and is generally not employed as a thermal insulator. The present invention comprises a coat having one or more pockets containing exothermic or energy storage type heaters and may be fitted to dogs, cats or other animals.

In U.S. Pat. No. Des. 330,954 to Nieding the ornamental design for a cat garment is disclosed for wear by cats. A disadvantage in this prior art lies in a lack of heat producing devices for therapeutic or cold weather usage. The present invention comprises a garment for wear by an animal having exothermically reacting or passive heat sources disposed therein.

U.S. Pat. No. Des. 312,151 to Dickey discloses the ornamental design of a canine protective garment. The disclosure teaches a garment devised to provide protection of a substantial portion of the underside of a dog. The disclosure makes no provision for providing heat to the dog's body. Furthermore, there are no provisions for thermally insulating a substantial portion of the dog's body. There is no teaching to install and remove heatable or chemically reactive pouches therein. The present invention comprises a pet garment having an insulating layer and one or more active or passive heat producers detachably placed therein.

In this respect, the heated pet sweater according to the present invention substantially departs from the conventional concepts and designs of the prior art, and in so doing provides an apparatus primarily developed for the purpose of providing heat to and maintaining warmth of an animal.

Therefore, it can be appreciated that there exists a continuing need for new and improved heated pet sweater which can be employed to provide therapeutic heat and thermal comfort for an animal. In this regard, the present invention substantially fulfills this need.

As illustrated by the background art, efforts are continuously being made in an attempt to improve pet thermal control garments. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of pet garments now present in the prior art, the present invention provides an improved heated pet sweater construction wherein the same can be utilized for providing therapeutic heat or comfort warmth to an animal. As such, the general purpose of the present invention, which will be described subsequently in greater detail, is to provide a new and improved heated pet sweater apparatus and method which has all the advantages of the prior art pet thermal control garments and none of the disadvantages.

The invention is defined by the appended claims with the specific embodiment shown in the attached drawings. For the purpose of summarizing the invention, the invention may be incorporated into a sweater type thermally insulating garment for wear by an animal such as a dog or cat and having a plurality of closable pockets disposed a various sites thereon. The pockets are generally employed to hold sealed pouches of heat producing substance. One form of heat producer releases thermal energy by a slow exothermic chemical reaction and another form of heat producer involves microwave oven heating of a material having a high latent heat of fusion followed by use in the sweater where the excess heat is released at constant temperature. In an alternate embodiment a relatively lightweight or netlike sweater having pockets is fitted with pouches which absorb heat thereby producing a cooling effect for therapeutic or thermal comfort usage.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an improved heated pet sweater not requiring an electrical power source to supply heat to an animal.

It is therefore an additional object of the present invention to provide a new and improved heated pet sweater which has all the advantages of the prior art heated pet sweaters and none of the disadvantages.

It is another object of the present invention to provide a new and improved heated pet sweater which may be easily and efficiently manufactured and marketed.

It is a further object of the present invention to provide a new and improved heated pet sweater which is of a durable and reliable construction.

An even further object of the present invention is to provide a new and improved heated pet sweater which is susceptible of a low cost of manufacture with regard to both materials and labor, and which accordingly is then susceptible of low prices of sale to the consuming public, thereby making such heated pet sweaters economically available to the buying public.

Still yet another object of the present invention is to provide a new and improved heated pet sweater which provides in the apparatuses and methods of the prior art some of the advantages thereof, while simultaneously overcoming some of the disadvantages normally associated therewith.

Still another object of the present invention is to provide a new and improved heated pet sweater which is thermally insulative and thereby aids in maintaining the body heat of the animal wearer.

Yet another object of the present invention is to provide a new and improved heated pet sweater having a chemically reactive heating source supplying heat for extended periods to an animal wearer thereof.

Even still another object of the present invention is to provide a new and improved heated pet sweater having a passive heating source which may be heated in a microwave prior to use and furthermore which releases heat at substantially constant temperature over extended time periods.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
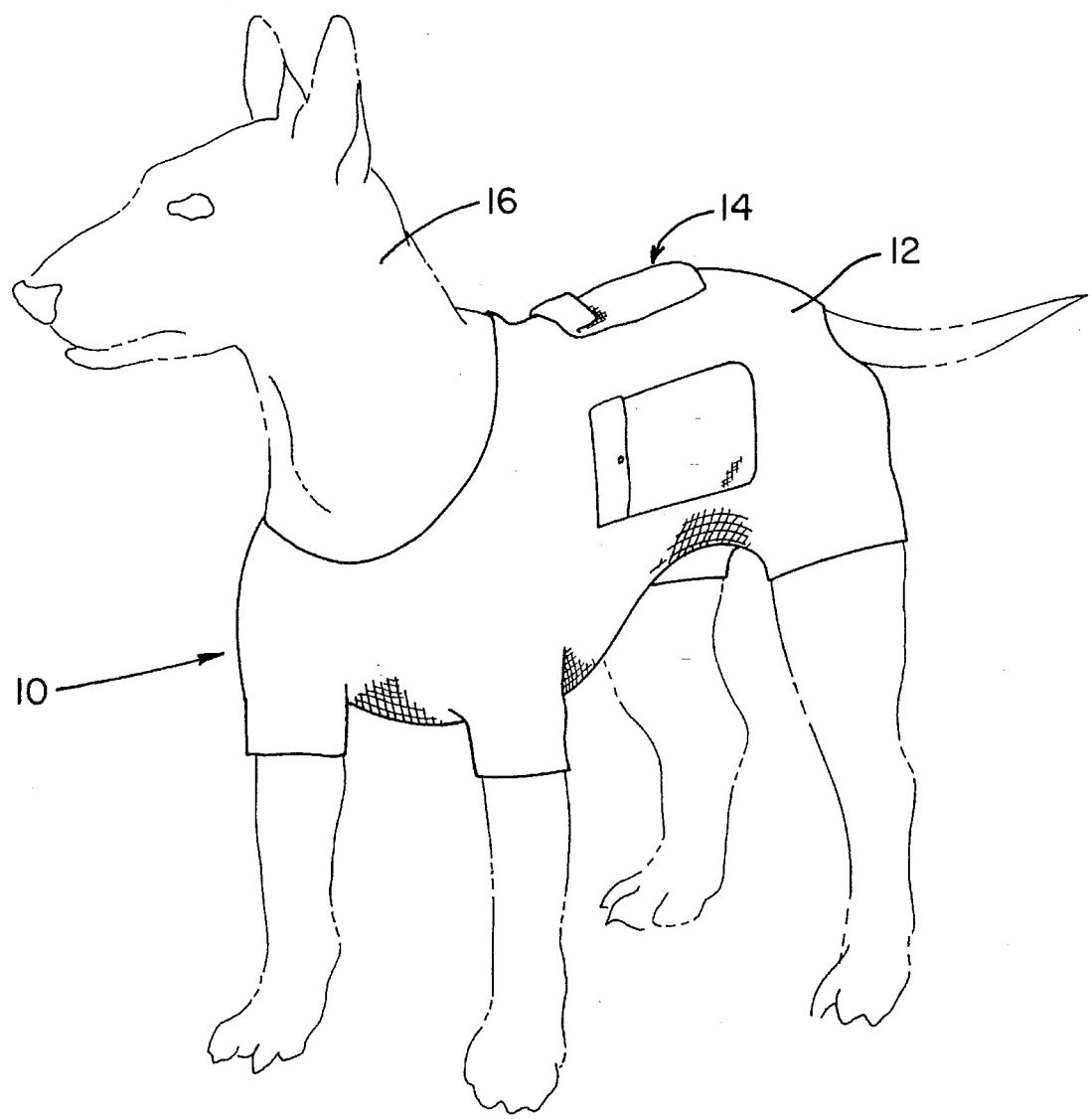
FIG. 1 is a perspective view of the heated pet sweater shown worn by a dog.

With reference now to the drawings, and in particular to FIG. 1 thereof, a new and improved heated pet sweater embodying the principles and concepts of the present invention and generally designated by the reference numeral 10 will be described.

From an overview standpoint, the heated pet sweater 10 is adapted for use with an animal such as a dog or cat to maintain body heat and provide additional heat therein. See FIG. 1. The heated pet sweater 10 comprises a sweaterlike garment 12 having a plurality of pockets 14 disposed thereupon for wear by animal 16. The pockets 14 are employed to hold pouches containing heat producing materials capable of providing warmth to the animal 16 for extended periods.

Figure 2:
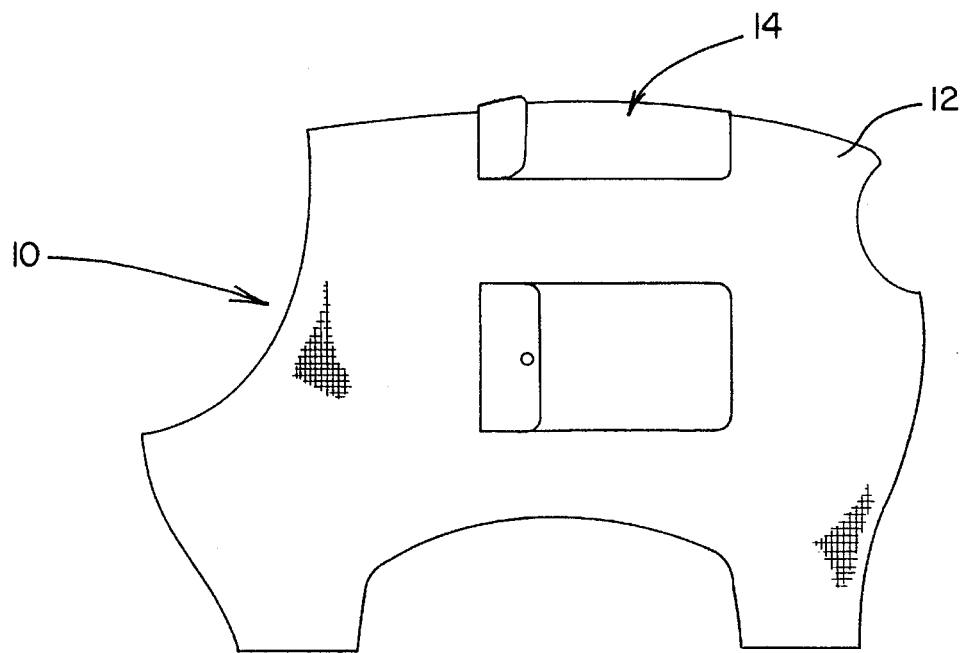
FIG. 2 is a side elevational view of the heated pet sweater showing a side pocket and a top pocket.
Figure 3:
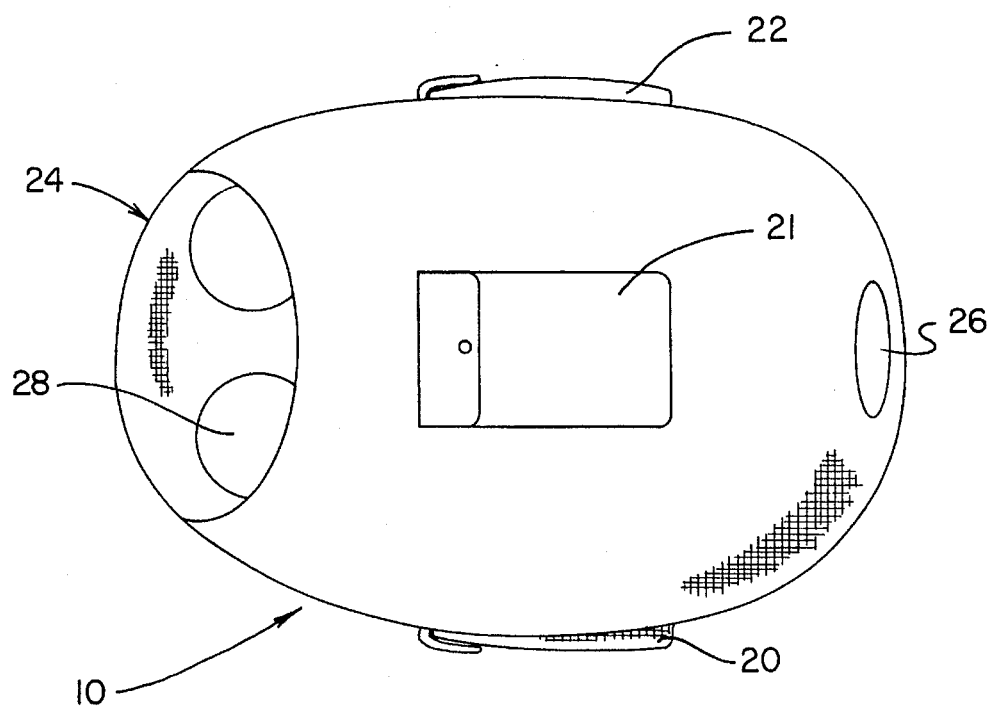
FIG. 3 is side elevational view of the heated pet sweater showing two side pockets and a top pocket.
Figure 4:
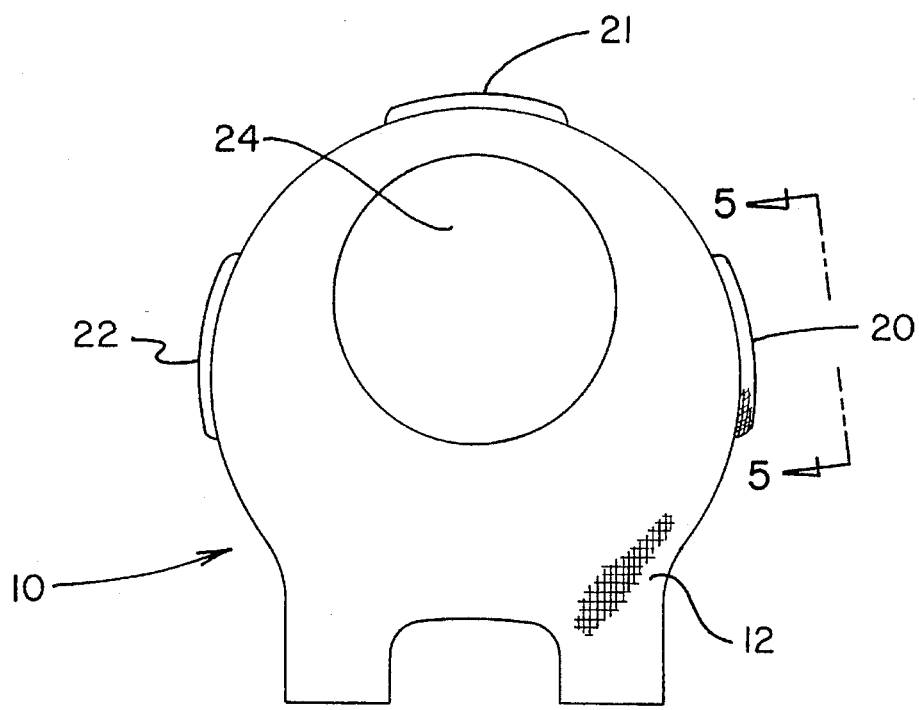
FIG. 4 is a side elevational view of a heated pet sweater showing a top and two side pockets.

More specifically, it will be noted that the heated pet sweater 10 comprises a woven fabriclike material forming garment 12 and pockets 14. See FIG. 2. The heated pet sweater 10 may be provided in a variety of shapes and forms to fit any of a variety of animals including dogs and cats of diverse breeds. (Some fit adjustability of the heated pet sweater) 10 may be achieved by addition of adjustable straps, use of elastic members, or adjustable fastening by hook and loop fasteners in a manner which will not restrict breathing or other movements of animal 16 during wear. Typically, three rectangularly shaped pockets 20, 21 and 22 are disposed upon garment 12 although more or less pockets 14 and pocket 14 shapes ranging in major cross section from squares to complex polygons may be employed. See FIG. 3. Garment 12 has provision for emergence of an animal head and neck 24, tail 26, and legs 28, and generally may have additional provisions including a substantially open underportion for animal comfort as required. See FIG. 4.

Figure 5:
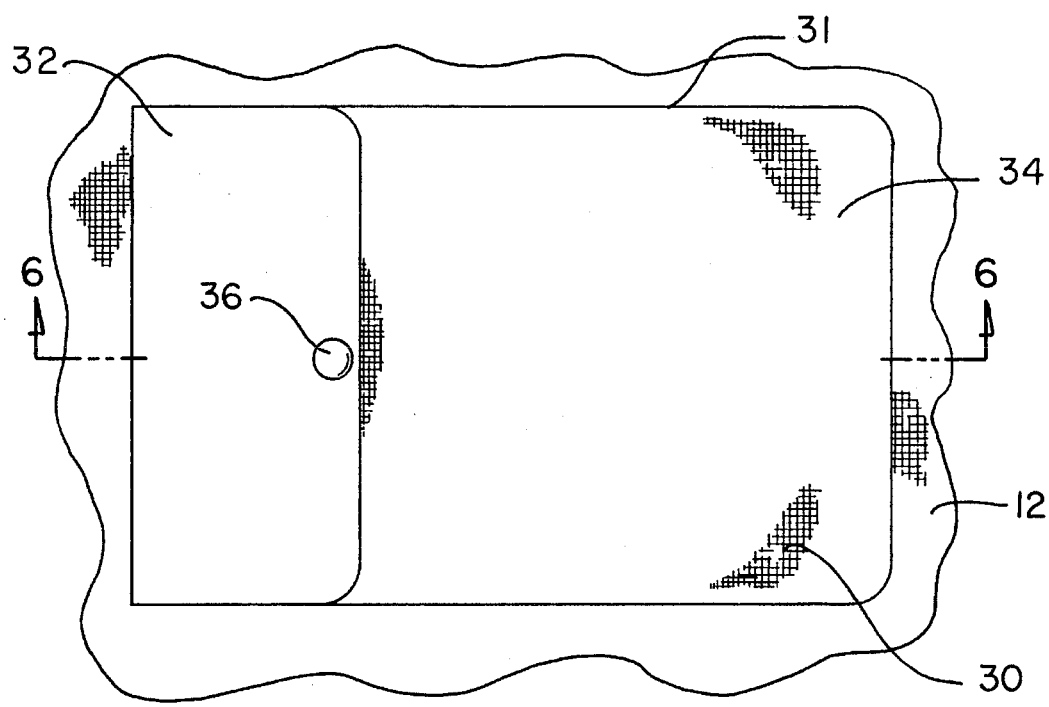
FIG. 5 is a fragmentary side sectional view of the heated pet sweater taken substantially upon the plane indicated by the section line 5—5 of FIG. 4.
Figure 6:
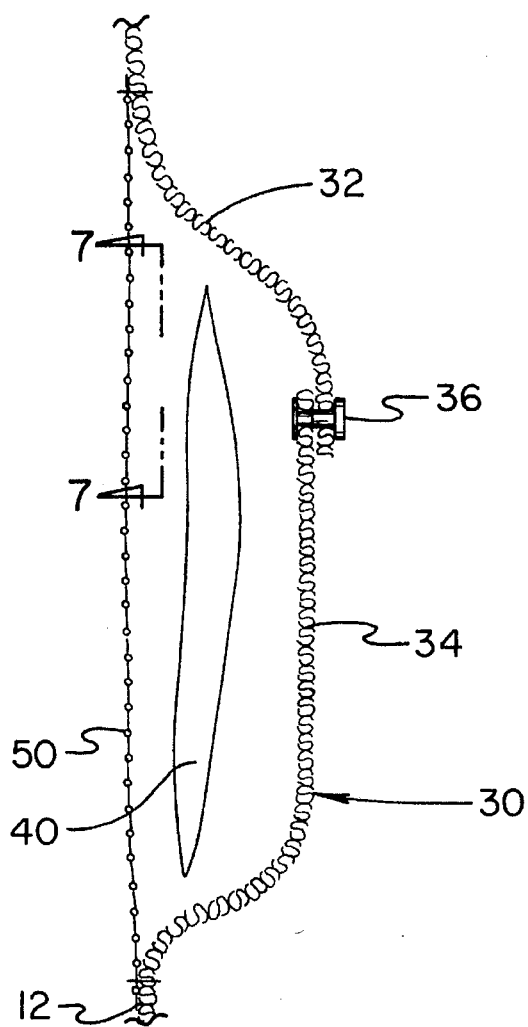
FIG. 6 is a fragmentary side sectional view of the heated pet sweater taken substantially upon the plane indicated by the section line 6—6 of FIG. 5.
Figure 7:
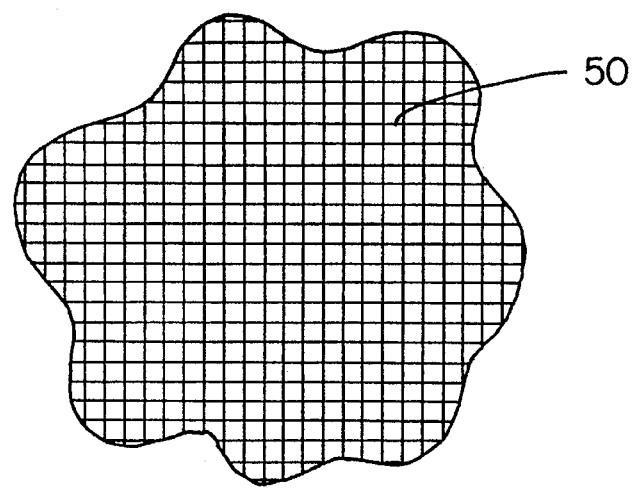
FIG. 7 is a side sectional view of the heated pet sweater taken substantially upon the plane indicated by the section line 7—7 of FIG. 6.

Pocket 14 comprises a fabriclike material 30 sewn or otherwise bonded to garment 12 along a periphery 31. Fabriclike material 30 is generally a thermally insulating layer which reduces heat transfer therethrough and thereby provides directed heat transmission through garment 12 to animal 16. Fabriclike material 30 may be an extension of garment 12 thereby forming an insulative outer pocket layer. See FIGS. 5 and 6. Thermally transmissive netlike member 50 may be employed to permit substantially free passage of thermal energy therethrough to the animal 16. See FIG. 7. Flap 32 overlaps a portion of pocket body 34 thereby providing closure. Snap 36 maintains closure of pocket 14, however alternate closure means may be employed such as providing a multiplicity of minute hooklike projections disposed upon a portion of flap 32 which engage a pile section affixed to a portion of pocket body 34.

Pouch 40 may comprise an outer filmlike impermeable layer filled at least in part with a fluid or semifluid substance wherein the combination of impermeable layer and fluid or semifluid substance are generally of a shape similar to yet smaller than pocket 14 and removably fitting therein. Or pouch 40 may comprise a substantially soft and pliable material removably fitting pocket 14. The thermophysical characteristics of pouch 40 are characterized by either generation of heat therein by chemical reaction, or by slowly releasing heat previously stored therein by direct or latent thermal energy storage. For example, a combination of iron, water, cellulose, vermiculite, activated carbon, and salt may be employed to generate heat for periods up to or exceeding twenty hours by chemical oxidative reaction means.

Direct thermal energy storage involves prior heating of a material which responds by increasing temperature several degrees above the animal body temperature wherein the material has a high specific heat and adequate mass to enable heat release for extended periods. An insulative covering for direct thermal energy storage materials may be employed to controllably release heat to the animal 12 and, more particularly, a cover freely passing microwaves but providing some thermal isolation may be employed for microwave absorbing direct energy storage materials such as liquid water and aqueous solutions. Latent thermal energy storage materials such as aqueous dibasic ammonium phosphate or aqueous calcium chloride may be heated using a microwave oven or other methods whereby energy may be stored at constant temperature and undergo slow thermal energy release at constant temperature over a period of several hours.

A stoichiometric aqueous dibasic ammonium phosphate solution releases heat at approximately ninety six degrees Fahrenheit and a stoichiometric aqueous calcium chloride solution releases heat at approximately seventy four degrees Fahrenheit. Both aforementioned latent heat storage solutions susceptible to water cleanup if spilled and are not environmentally destructive. The aforementioned mixture of iron, water, cellulose, vermiculite, activated carbon, and salt is substantially biodegradable and is likewise environmentally safe.

In an alternate embodiment, latent heat energy storage materials such as coconut oil or aqueous calcium chloride may be employed in pouches to lower the body temperature of an animal by extracting heat therefrom. Both coconut oil and aqueous calcium chloride absorb thermal energy at a constant temperature of approximately seventy four degrees Fahrenheit. A garment 12 comprising a lightweight fabriclike material such as netting permitting substantially free transfer of thermal energy therethrough may be employed to hold pockets 14. Pockets 14 comprise an insulating material as before thereby mitigating thermal energy loss to the environment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A new and improved heated pet sweater for providing warmth to an animal wearer thereof comprising:

a garment for wear by an animal wherein said garment has thermal insulative properties, said garment comprising a sweaterlike article of woven yarn construction having a flap portion and a body portion which are susceptible to intentional opening and self maintained closure for introduction and removal of an energy production means therein, and furthermore an open meshlike interior closure is sewn or bonded over an inner portion thereby forming a pocket member having said meshlike interior closure substantially containing the body of the animal wearer thereof, said garment being of woolen or polymeric woven yarn construction;

a means for forming one or more pocket members upon the garment, said pocket members being detachably affixed to the garment at any of various locations using a snap fastener disposed upon a portion of the socket member;

a pocket member having thermally insulative properties and an openable closure means providing free access to the pocket member interior, said pocket member closure means comprising a snap fastener;

a thermal energy production means capable of being replaceably introduced within said pocket member thereby being affixed to the garment, and furthermore said thermal energy production means provides thermal energy for an extended period to an animal wearer of the garment at substantially constant temperature at or above said animal wearer body temperature, said thermal energy production means comprising an exothermically reactive combination of chemical agents replaceably disposed within said pocket members, said chemical agents comprising a combination of iron, water, cellulose, vermiculite activated carbon and salt.

* * * * *